(12) United States Patent
Tran

(10) Patent No.: US 11,745,672 B1
(45) Date of Patent: Sep. 5, 2023

(54) PROTECTIVE SHIELD FOR ATTACHMENT TO A VEHICLE HEAD REST

(71) Applicant: Andy Tran, Englewood, CO (US)

(72) Inventor: Andy Tran, Englewood, CO (US)

( * ) Notice: Subject to any disclaimer, the term of this patent is extended or adjusted under 35 U.S.C. 154(b) by 367 days.

(21) Appl. No.: 16/932,149

(22) Filed: Jul. 17, 2020

(51) Int. Cl.
*B60R 13/08* (2006.01)
*B60N 2/879* (2018.01)

(52) U.S. Cl.
CPC .......... *B60R 13/0823* (2013.01); *B60N 2/879* (2018.02)

(58) Field of Classification Search
CPC .... B60R 13/0823; B60R 21/026; B60N 2/879
USPC ........................................... 296/24.46, 24.43
See application file for complete search history.

(56) References Cited

U.S. PATENT DOCUMENTS

| | | | | |
|---|---|---|---|---|
| 10,875,464 B1* | 12/2020 | Tsao | ................. | B60R 11/00 |
| 2006/0032996 A1* | 2/2006 | Wu | ................. | B60R 11/0235 |
| | | | | 248/218.4 |
| 2009/0174238 A1* | 7/2009 | Kuno | ................. | B60R 11/0235 |
| | | | | 297/217.3 |
| 2012/0125959 A1* | 5/2012 | Kucera | ................. | B60N 2/879 |
| | | | | 224/275 |
| 2018/0257575 A1* | 9/2018 | Sanchez | ................. | B60R 7/10 |
| 2018/0305021 A1* | 10/2018 | Marquet | .......... | B64D 11/00152 |

FOREIGN PATENT DOCUMENTS

| | | | | |
|---|---|---|---|---|
| DE | 9407193 U1 | * | 11/1994 | |
| DE | 29914518 U1 | * | 12/1999 | ........... B60R 21/026 |
| DE | 202016102108 U1 | * | 8/2016 | |
| FR | 2898313 A3 | * | 9/2007 | ............. B60R 21/06 |
| GB | 2438045 A | * | 11/2007 | ............... B60N 2/48 |
| KR | 101162831 B1 | * | 7/2012 | |
| WO | WO-2007129029 A2 | * | 11/2007 | ............... B60N 2/80 |
| WO | WO-2017203433 A1 | * | 11/2017 | ........... A01K 1/0272 |

* cited by examiner

Primary Examiner — Hilary L Gutman
(74) Attorney, Agent, or Firm — Edwin H. Crabtree; Ramon L. Pizarro

(57) ABSTRACT

A two piece attachment device used for securing a protective shield to a vehicle's head rest poles. The attachment device, as a first piece, includes a pair of shield plates, which include a front plate and a rear plate, attached to opposite sides of the protective shield. The front plate includes a shield attachment screw hole. The attachment device also includes, as a second piece, a head rest pole attachment plate. The attachment plate includes a pair of horizontal pole attachment arms with pole attachment channels. The attachment arms adapted for receipt around a portion of a pair of spaced apart, vertical, head rest poles. The attachment device further includes an "L" shaped shield release plate for attachment to the head rest pole attachment plate. The "L" shaped shield release plate is releasably attached to the front shield plate, using a shield attachment screw received in the shield.

10 Claims, 3 Drawing Sheets

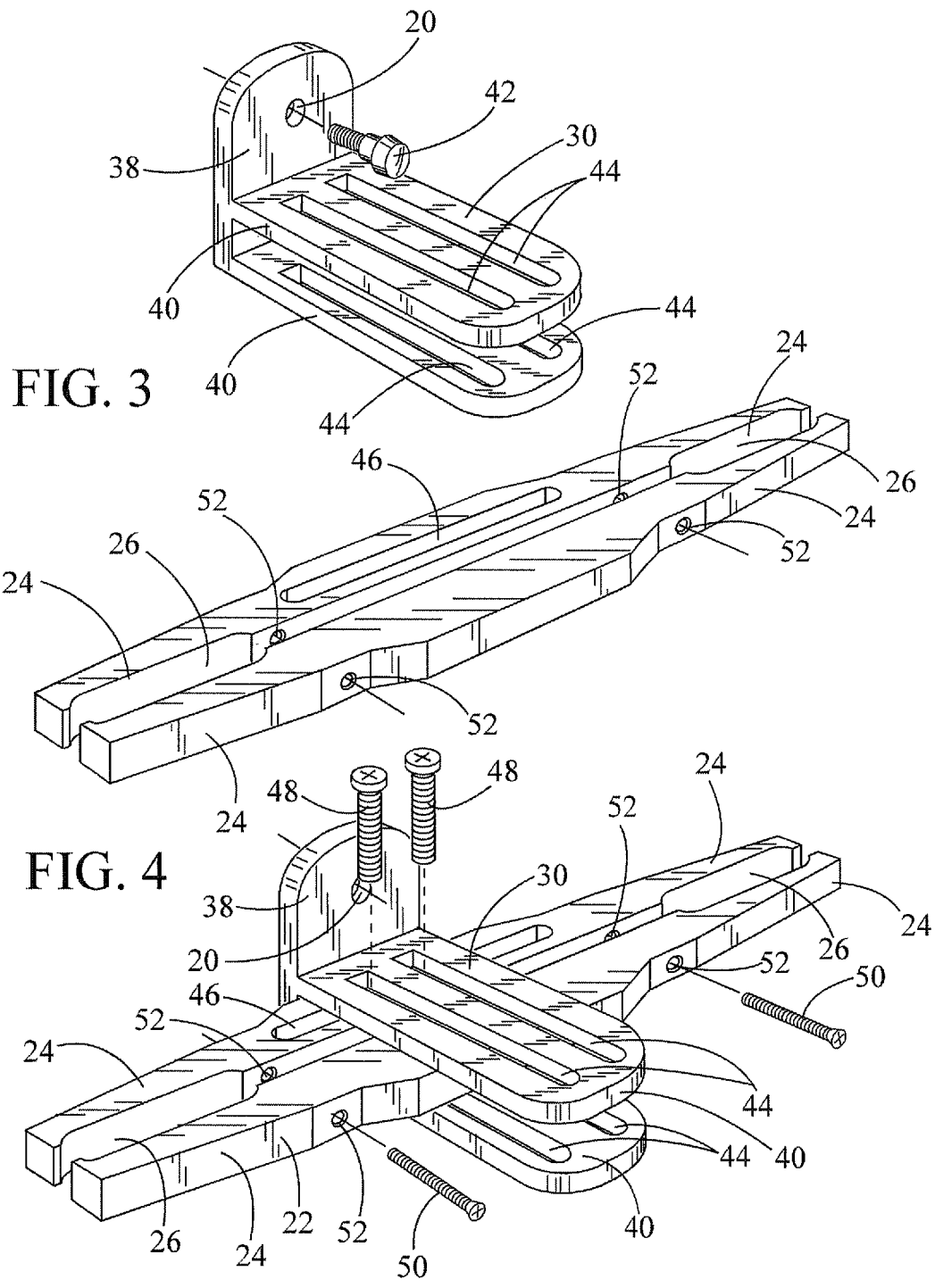

PROTECTIVE SHIELD FOR ATTACHMENT TO A VEHICLE HEAD REST

BACKGROUND OF THE INVENTION

(a) Field of the Invention

This invention relates to a protective shield for mounting inside a vehicle and more particularly, but not by way of limitation, to a two piece, removable, attachment device for securing the protective shield to a vehicles head rest. The protective shield is contoured to fit behind a driver's seat or behind a front passenger seat.

(b) Discussion of Prior Art

Heretofore, there have been a number of different types of patented protective shields for mounting inside a vehicle. For example, in U.S. Pat. No. 3,549,195 to Kallinikos, a driver protective apparatus for a taxicab is disclosed. In U.S. Pat. No. 3,397,005 to May et al. an automobile with a robbery preventing partition is illustrated. In US 2009/0301290 to Adler, a personal protection apparatus for vehicles is shown.

None of the above mentioned prior art vehicle protection apparatus disclose or teach the unique features, objects and advantages of the subject two piece, removable, protective shield for attaching to a seat head rest as disclosed herein.

SUMMARY OF THE INVENTION

In view of the foregoing, it is a primary objective of the subject invention to protect a vehicle driver and passengers from a potential robbery and from possibly contacting a virus, such as a corona virus, carried by the driver or a passenger, when sneezing, coughing and being in close contact with one another.

Another Object of the invention is the protective shield can be quickly attached to a pair of head rest poles and quickly removed from the poles for storage.

Yet another object of the invention is the protective shield can be made of clear plastic or glass and having various thickness and up to a bullet proof thick glass.

The subject invention includes a two piece attachment device for securing a protective shield to a vehicle's head rest poles. The attachment device, as a first piece, includes a pair of shield plates, which include a front plate and a rear plate, attached to opposite sides of the protective shield. The shield is contoured for receipt behind a front driver's seat or a front passenger seat. The front plate includes a shield attachment screw hole.

The attachment device also includes, as a second piece, a head rest pole attachment plate. The attachment plate includes a pair of horizontal pole attachment arms with pole adjustment channels. The attachment arms adapted for receipt around a portion of a pair of spaced apart, vertical, head rest poles. The poles are attached to a bottom portion of a head rest and slidably received in a top portion of a vehicle seat. The attachment device further includes an "L" shaped shield release plate for attachment to the head rest pole attachment plate. The "L" shaped shield release plate is releasably attached to the front shield plate, using a shield attachment screw received in the shield.

These and other objects of the present invention will become apparent to those familiar with various types of protective shields when reviewing the following detailed description, showing novel construction, combination, and elements as described, and more particularly defined by the claims, it being understood that changes in the embodiments to the disclosed invention are meant to be included as coming within the scope of the claims, except insofar as they may be precluded by prior art references.

BRIEF DESCRIPTION OF THE DRAWINGS

The accompanying drawings illustrate complete preferred embodiments in the present invention according to the best modes devised for the practical application of the subject vehicle protective shield, and in which:

FIGS. 3, 4, and 5 are perspective views of the head rest pole attachment and adjustment plates used to secure the protective shield to the head rest poles.

DETAILED DESCRIPTION OF THE PREFERRED EMBODIMENTS

Figure 1:
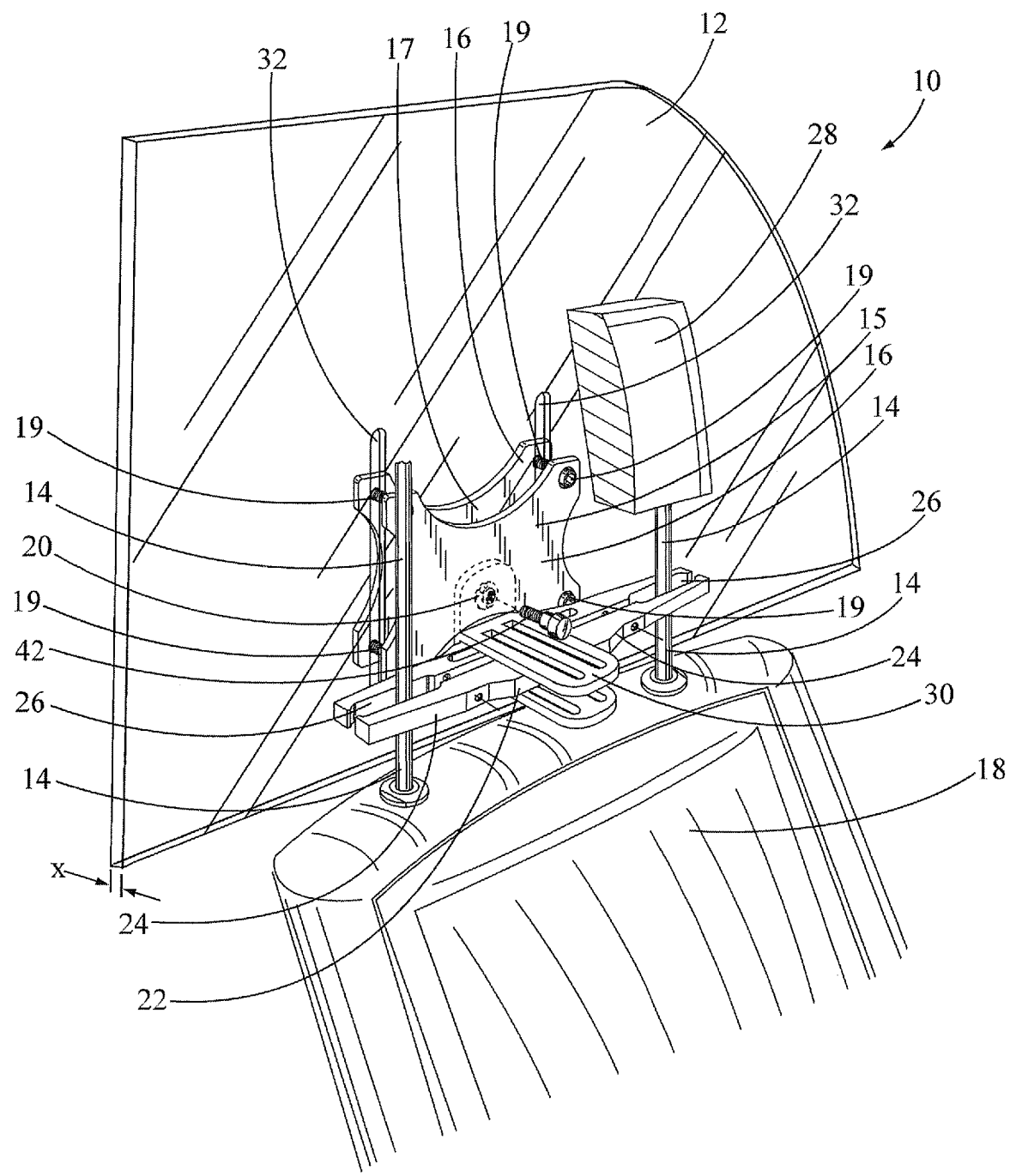
FIG. 1 is a perspective view of the protective shield releaseably attached to a pair of spaced apart, vertical head rest poles. The poles are shown attached to a head rest and a vehicle front seat.

In FIG. 1, a perspective view of the subject two piece attachment device is shown having a general reference numeral 10. A first piece of the attachment device 10 is used for securing a protective shield 12 to a pair of spaced apart, vertical, vehicle head rest poles 14. The attachment device 10 includes a pair of shield plates 16, including a front plate 15 and a rear plate 17, attached to opposite sides of the protective shield 12, using threaded screws. 19. The shield 12 is contoured for receipt behind a front driver's seat 18 or a front passenger seat. The front shield plate 15 includes a shield attachment screw hole 20. Also, the shield 12 has a thickness "X" in a range of $1/8^{th}$ to $1/4^{th}$ inches.

A second piece of the attachment device 10 includes a head rest pole attachment plate 22. The attachment plate 22 includes a pair of horizontal pole attachment arms 24, with pole attachment channels 26 therebetween. The attachment arms are adapted for receipt around a portion of spaced apart vertical head rest poles 14. The poles 14 are attached to a bottom portion of a head rest 28 and slidably received in a top portion of a vehicle seat 18. A portion of the head rest 28 has been cut away in the drawing.

The second piece of the attachment device 10 further includes an "L" shaped shield release plate 30 for attachment to the head rest pole adjustment plate 22 and releasably attached to the front plate 15.

Figure 2:
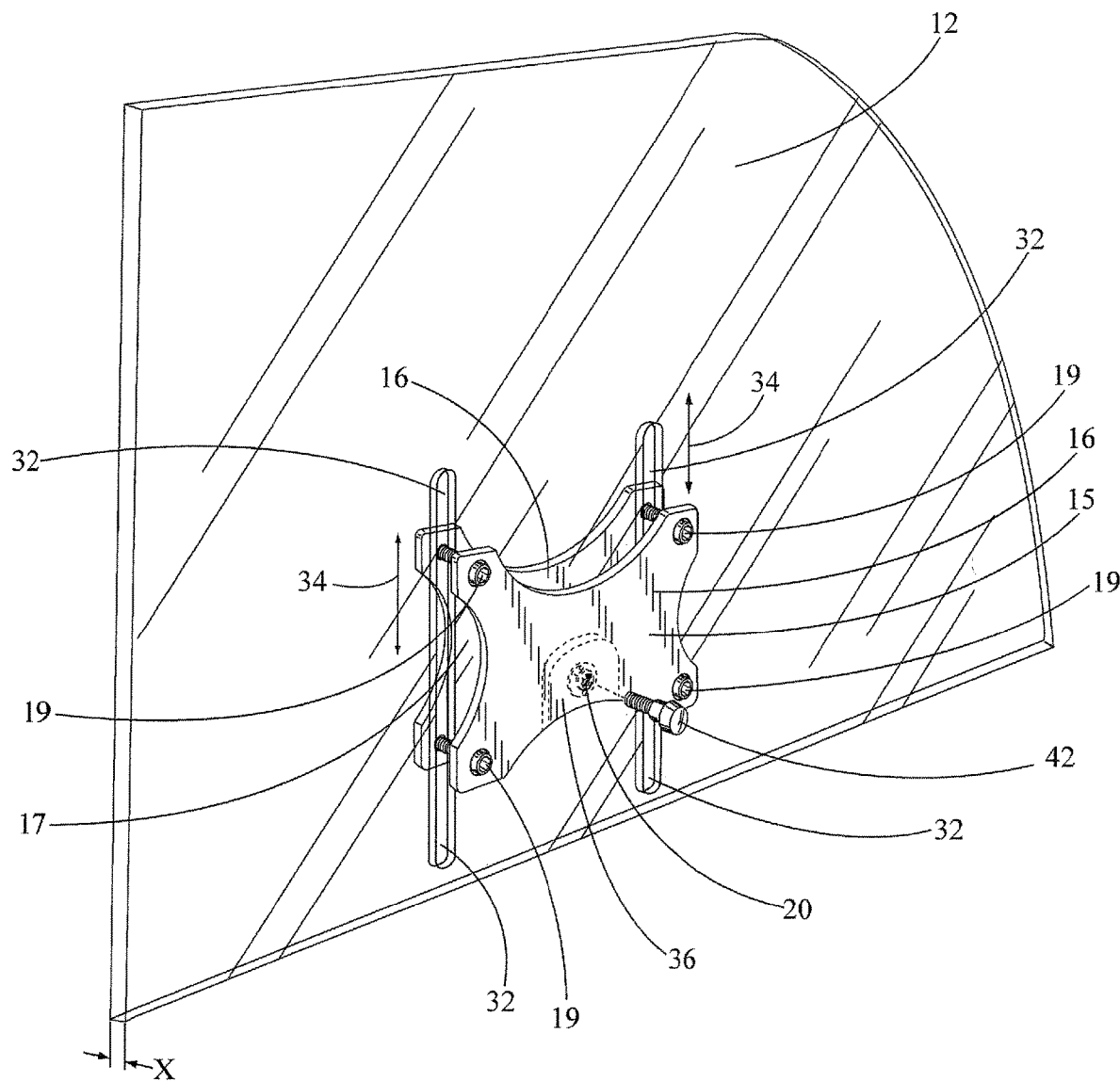
FIG. 2 is a perspective view of a pair of shield plates, which include a front plate and a rear plate, attached to opposite sides of the protective shield.

In FIG. 2, a perspective view of the front shield plate 15 and the rear shield plate 17 are shown attached to opposite sides of the protective shield 12, using threaded screws 19. The shield 12 includes a pair of spaced apart vertical channels 32. The channels 32 are used for adjusting, up and down as indicated by arrows 34, the shield on the on the front plate 15 and rear plate 17.

Also shown in this drawing, in dotted lines, is a pocket 35, 36 formed in the back of the front plate 15. The pocket 36 is used to receive a vertical arm 38 therein. The vertical arm is attached to one end of a pair of horizontal arms 40 The arms 38 and 40 make up the "L" shaped shield release plate 30, shown in FIGS. 1, 3 and 5.

In FIG. 3, a perspective view of the "L" shaped shield release plate 30 is shown. The vertical arm 38 is shown with the shield attachment screw hole 20 for receiving a shield attachment screw 42. The screw 42 is important when attaching to and releasing the shield 12 from the pole attachment plate 22. The horizontal arms 40 include elongated channels 44, which allow the "L" shaped shield release plate 30 to be adjusted, front and back, on the pole adjustment arms 24.

In FIG. 4, a perspective view of the head rest pole attachment plate 22 is shown. As mentioned above, the attachment plate 22 includes the pair of horizontal pole attachment arms 24, with the pole attachment channels 26. The arms 24 are adapted for receipt around a portion of spaced apart vertical head rest poles 14. The attachment plate 22 also includes an elongated channel 46, parallel to the pole attachment channels 26 for receiving threaded screws 48. The threaded screws 48 are used for attaching the "L" shaped shield release plate 30 to the pole attachment plate 22, as shown in FIG. 5. In FIG. 5, a center portion of the pole attachment plate 22 is shown received between the horizontal arms 40 of the "L" shaped shield release plate 30. Also, threaded screws 50 are shown ready to be inserted in screw holes 52 for tightening the pole attachment arms 24 on the head rest poles 14, as shown in FIG. 1.

While the invention has been particularly shown, described and illustrated in detail with reference to the preferred embodiments, it should be understood by those skilled in the art that equivalent changes in form and detail may be made without departing from the true spirit and scope of the invention as claimed except as precluded by the prior art.

The embodiments of the invention for which as exclusive privilege and property right is claimed are defined as follows:

1. A two piece attachment device for attachment to a pair of vehicle head rest poles, the attachment device comprising:
   a first piece including a pair of shield plates, the shield plates include a front plate and a rear plate attached to opposite sides of a protective shield, the protective shield contoured and adapted for receipt behind a front driver's seat or a front passenger seat, the front plate including a shield attachment screw hole and a pocket centered on the back of the front plate; and
   a second piece including a head rest pole attachment plate, the head rest pole attachment plate adapted for attachment to the head rest poles, the attachment plate releasably attached to the front plate.

2. The attachment device as described in claim 1 further including a shield attachment screw for receipt in the shield attachment screw hole.

3. The attachment device as described in claim 1 wherein the head rest pole attachment plate includes a pair of horizontal pole attachment arms with pole attachment channels therebetween.

4. The attachment device as described in claim 3 further including an "L" shaped shield release plate for attachment to the head rest pole attachment plate, the "L" shaped shield release plate releasably attached to the front plate.

5. A two piece attachment device for attachment to a pair of vehicle head rest poles, the attachment device comprising:
   a first piece including a pair of shield plates, the shield plates include a front plate and a rear plate attached to opposite sides of a protective shield, the protective shield contoured and adapted for receipt behind a front driver's seat or a front passenger seat, the front plate including a shield attachment screw hole and a pocket centered on the back of the front plate;
   a second piece including a head rest pole attachment plate, the head rest pole attachment plate adapted for attachment to the head rest poles, the attachment plate releasably attached to front plate, the head rest pole attachment plate includes a pair of horizontal pole attachment arms with pole attachment channels therebetween, and
   a shield attachment screw for receipt in the shield attachment screw hole.

6. The attachment device as described in claim 5 further including an "L" shaped shield release plate for attachment to the head rest pole attachment plate, the "L" shaped shield release plate releasably attached to the front plate.

7. The attachment device as described in claim 5 wherein the shield has a thickness "X" in a range of $1/8^{th}$ to $1/4^{th}$ inches.

8. A two piece attachment device for attachment to a pair of vehicle head rest poles, the attachment device comprising:
   a first piece including a pair of shield plates, the shield plates include a front plate and a rear plate attached to opposite sides of a protective shield, the protective shield contoured and adapted for receipt behind a front driver's seat or a front passenger seat, the protective shield having a thickness "X" in a range of $1/8^{th}$ to $1/4^{th}$ inches, the front plate including a shield attachment screw hole and a pocket centered on the back of the front plate;
   a second piece including a head rest pole attachment plate, the head rest pole attachment plate adapted for attachment to the head rest poles, the attachment plate releasably attached to front plate; and
   a shield attachment screw for receipt in the shield attachment screw hole.

9. The attachment device as described in claim 8 wherein the head rest pole attachment plate includes a pair of horizontal pole attachment arms with pole attachment channels therebetween.

10. The attachment device as described in claim 8 further including an "L" shaped shield release plate for attachment to the head rest pole attachment plate, the "L" shaped shield release plate releasably attached to the front plate.

\* \* \* \* \*